United States Patent Office 3,590,054
Patented June 29, 1971

---

3,590,054
**2-(2,4-DICHLOROPHENOXYACETYL)-4-METHYL-
1,2,4-OXADIAZOLIDINE-3,5-DIONE**
John Krenzer, Oak Park, Ill., assignor to Velsicol
Chemical Corporation, Chicago, Ill.
No Drawing. Filed Aug. 28, 1969, Ser. No. 853,945
Int. Cl. C07d *85/00*
U.S. Cl. 260—307      1 Claim

ABSTRACT OF THE DISCLOSURE

This invention discloses the compound 2-(2,4-dichlorophenoxyacetyl)-4-methyl-1,2,4-oxadiazolidine - 3,5-dione and its use as a herbicide. Further disclosed are the compounds potassium 4-methyl-1,2,4-oxadiazolidine-3,5-dione and sodium 4-methyl-1,2,4-oxadiazolidine-3,5-dione.

---

This invention relates to the new compound 2-(2,4-dichlorophenoxyacetyl) - 4 - methyl-1,2,4-oxadiazolidine-3,5-dione and its use as a herbicide and to the new compounds potassium 4-methyl-1,2,4-oxadiazolidine-3,5-dione and sodium 4-methyl-1,2,4-oxadiazolidine-3,5-dione.

The herbicidal compound of the present invention has the structural formula

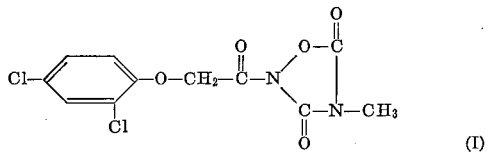

and can be prepared by reacting 2,4-dichlorophenoxyacetyl chloride with an intermediate compound of this invention having the structural formula

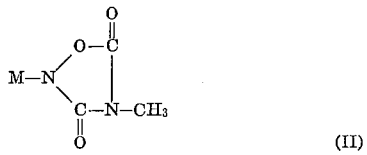

wherein M is potassium or sodium.

This reaction can be effected by combining the reactants in an inert organic reaction medium such as acetone and heating the mixture for a period of several hours. After this time the reaction mixture can be filtered to remove the potassium chloride that has formed and can be stripped of solvent to obtain the desired product.

The intermediate compounds of Formula II of this invention can be prepared from the known compound N-hydroxy-O-ethylcarbamate Journal of Organic Chemistry, 24, 431(1959)) by reaction with methyl isocyanate and thereafter treating with potassium or sodium hydroxide. This reaction can be effected by slowly adding the isocyanate to a solution of the carbamate in a suitable solvent such as diethylether and in the presence of a small quantity of dibutyltin diacetate catalyst and thereafter treating the resulting product, which can be recovered upon evaporation of the solvent and excess isocyanate, with an alcoholic solution of the potassium or sodium hydroxide. The desired product forms as a precipitate and can be recovered by conventional means.

The preparation of the compounds of the present invention is more specifically illustrated in the following examples.

EXAMPLE 1

Preparation of potassium 4-methyl-1,2,4-oxadiazolidine-3,5-dione

N-hydroxy-O-ethylcarbamate (240 grams), diethylether (100 ml.) and dibutyltin diacetate (2 drops) were charged into a glass reaction vessel equipped with a mechanical stirrer and reflux condenser. Methyl isocyanate (150 ml.; 2.54 mol was then added, with stirring over a period of about 1 hour. After this time the reaction mixture was subjected to distillation to remove the solvent and excess isocyanate from the reaction product which had formed. Part of the product (81 grams) was then added to a solution of potassium hydroxide (32.5 grams; 87%) in methanol (400 ml.) at 25° C. resulting in the formation of a precipitate. This precipitate was recovered by filtration and was recrystallized from methanol to yield the desired product potassium 4-methyl-1,2,4-oxadiazolidine-3,5-dione having the following elemental analysis as calculated for $C_3H_3KN_2O_3$.—Theoretical (percent): C, 23.38; H, 1.96; N, 18.18. Found (percent): C, 22.82; H, 1.89; N, 17.94.

EXAMPLE 2

Preparation of 2-(2,4-dichlorophenoxyacetyl)-4-methyl-1,2,4-oxadiazolidine-3,5-dione 2,4-dichlorophenoxyacetyl chloride (9.2 grams), potassium 4-methyl-1,2,4 - oxadiazolidine - 3,5-dione (6 grams) and acetone were charged into a glass reaction vessel equipped with a mechanical stirrer. The reaction mixture was stirred for a period of about four hours at room temperature. After this time the reaction mixture was filtered to remove the potassium chloride which had formed. The filtrate was then stripped of solvent under reduced pressure to yield a solid residue. The residue was recrystallized from n-propanol to yield the desired product 2-(2,4-dichlorophenoxyacetyl)-4-methyl-1,2,4-oxadiazolidine-3,5-dione having a melting point of 138 to 139° C. and having the following elemental analysis as calculated for $C_{11}H_8Cl_2N_2O_5$.—Theoretical (percent): C, 41.44; H, 2.53; N, 8.78. Found (percent): C, 40.77; H, 2.57; N, 8.57.

EXAMPLE 3

Preparation of sodium 4-methyl-1,2,4-oxadiazolidine-3,5-dione

N-hydroxy-O-ethylcarbamate (210 grams; 2 mol) diethylether (100 ml.) and dibutyltin diacetate (2 drops) are charged into a glass reaction vessel equipped with a mechanical stirrer and reflux condenser. Methyl isocyanate (150 ml.; 2.54 mol) is then added, with stirring, over a period of about 1 hour. After this time the reaction mixture is subjected to distillation to remove the solvent and excess isocyanate from the reaction product which is formed. Eighty grams of this product are then added to a solution of sodium hydroxide (20 grams) in methanol (350 ml.) at room temperature resulting in the formation of a precipitate. This precipitate is recovered by filtration and is recrystallized to yield the desired product sodium 4-methyl-1,2,4-oxadiazolidine-3,5-dione.

EXAMPLE 4

Preparation of 2-(2,4-dichlorophenoxyacetyl)-4-methyl-1,2,4-oxadiazolidine-3,5-dione 2,4-dichlorophenoxyacetyl chloride (24 grams; 0.1 mol), sodium 4 - methyl - 1,2,4 - oxadiazolidine-3,5-dione (14.8 grams; 0.1 mol) and acetone are charged into a glass reaction vessel equipped with a mechanical stirrer. The reaction mixture is stirred for a period of about 4 hours and is then filtered to remove the sodium chloride that is formed. The filtrate is then stripped of solvent under reduced pressure to yield the desired product 2-(2,4-dichlorophenoxyacetyl)-4-methyl - 1,2,4 - oxadiazolidine-3,5-dione as the residue.

For practical use as a herbicide, the compound of this invention is generally incorporated into herbicidal compositions which comprise an inert carrier and a herbicidally toxic amount of the compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

The active compound is sufficiently soluble in common organic solvents such as kerosene or xylene so that it can be used directly as solutions in these solvents. Frequently, solutions of herbicides can be dispersed under superatmospheric pressure as aerosols. However, preferred liquid herbicidal compositions are emulsifiable concentrates, which comprise the active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 5

Preparation of a dust

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compound of this invention can be applied as a herbicide in any manner recognized by the art. One method for the control of weeds comprises contacting the locus of said weeds with a herbicidal composition comprising an inert carrier and, as an essential active ingredient, in a quantity which is herbicidally toxic to said weeds, the compound of the present invention. The concentration of the new compound of this invention in the herbicidal compositions will vary greatly with the type of formulation and the purpose for which it is designed, but generally the herbicidal compositions will comprise from about 0.05 to about 95 percent by weight of the active compound of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactiavtors, adhesives, stickers, fertilizers, activators, synergists, and the like.

The compound of the present invention is also useful when combined with other herbicides and/or defoliants, dessicants, growth inhibitors, and the like in the herbicidal compositions heretofore described. These other materials can comprise from about 5% to about 95% of the active ingredients in the herbicidal compositions. Use of combinations of these other herbicides and/or defoliants, dessicants, etc. with the compound of the present invention provide herbicidal compositions which are more effective in controlling weeds and often provide results unattainable with separate compositions of the individual herbicides. The other herbicides, defoliants, dessicants and plant growth inhibitors, with which the compound of this invention can be used in the herbicial compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TES, 3,4-DA, silvex, and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4-(chloroacetyl)morpholine, 1-(chloroacetyl)piperidine, and the like; chlorinated aliphatic acid herbicides such as TCA, dalapon, 2,3-dichloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid, and the like; and such compounds as aminotriazole, maleic hydrazide, phenyl mercuric acetate, endothal, biuret, technical chlordane, dimethyl 2,3,5,6-tetrachlorotetraphthalate, diquat, erbon DNC, DNBP, dichlobenil, DPA, diphenamid, dipropalin, trifluralin, solan, dicryl, merphos, DMPA, O-S-dimethyl tetrachlorothioterephthalate, methyl 2,3,5,6-tetracholor-N-methoxy-N-methylterephthalamate, 2-[4-chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennils such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and wintercress.

Similarly, such weeds can be classified as broadleaf or grassy weeds. It is economically desirable to control the growth of such weeds without damaging beneficial plants or livestock.

The new compound of this invention is particularly valuable for weed control because it is toxic to many species and groups of weeds while relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of the active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compound of this invention can be illustrated by established testing techniques known to the art.

The herbicidal activity of the compound of this invention was demonstrated by experiments carried out for the post-emergence control of a variety of weeds. In these experiments the compound 2-(2,4-dichlorophenoxyacetyl)-4-methyl-1,2,4-oxadiazolidine-3,5-dione was formulated as an aqueous emulsion and sprayed at the indicated dosage on the foliage of the various weeds that had attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 as follows: 0=no injury, 1,2=slight injury, 3,4=moderate injury, 5,6=moderately severe injury, 7,8,9=severe injury and 10=death. The effectiveness of these compounds is demonstrated by the following data:

TABLE I

| Weed species | Concentration of compound in lbs./acre | Injury rating |
| --- | --- | --- |
| Bindweed | 8 | 10 |
| Do | 4 | 10 |
| Do | 2 | 10 |
| Coffeeweed | 8 | 10 |
| Do | 4 | 10 |
| Do | 2 | 10 |
| Crabgrass | 8 | 9 |
| Do | 4 | 9 |
| Do | 2 | 8 |
| Curly dock | 8 | 10 |
| Do | 4 | 10 |
| Do | 2 | 9 |
| Foxtail | 8 | 10 |
| Do | 4 | 10 |
| Do | 2 | 9 |
| Mustard weed | 8 | 10 |
| Do | 4 | 10 |
| Do | 2 | 10 |
| Pigweed | 8 | 10 |
| Do | 4 | 10 |
| Do | 2 | 8 |
| Velvet leaf | 8 | 10 |
| Do | 4 | 10 |
| Do | 2 | 10 |

I claim:
1. 2-(2,4-dichlorophenoxyacetyl)-4-methyl-1,2,4-oxadiazolidine-3,5-dione.

References Cited
UNITED STATES PATENTS 3,437,664   4/1969   Krenzer _____ 260—307

ALEX MAZEL, Primary Examiner

R. V. RUSH, Assistant Examiner

U.S. Cl. X.R.

71—92